(12) United States Patent
Volfson

(10) Patent No.: US 12,489,970 B2
(45) Date of Patent: Dec. 2, 2025

(54) SEPARABLE COMMON APERTURE FUSION BINOCULAR

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 25 days.

(21) Appl. No.: 18/414,884

(22) Filed: Jan. 17, 2024

(65) Prior Publication Data

US 2024/0244318 A1 Jul. 18, 2024

Related U.S. Application Data

(60) Provisional application No. 63/439,307, filed on Jan. 17, 2023.

(51) Int. Cl.
*H04N 23/66* (2023.01)
*H04N 23/20* (2023.01)
*G02B 23/18* (2006.01)

(52) U.S. Cl.
CPC ............. *H04N 23/66* (2023.01); *H04N 23/20* (2023.01); *G02B 23/18* (2013.01)

(58) Field of Classification Search
None
See application file for complete search history.

(56) References Cited

U.S. PATENT DOCUMENTS

| | | | |
|---|---|---|---|
| 2002/0030163 A1* | 3/2002 | Zhang | G02B 23/125 |
| | | | 348/E5.09 |
| 2018/0368656 A1* | 12/2018 | Austin | A61B 1/24 |
| 2021/0038070 A1* | 2/2021 | Charles | A61F 9/007 |
| 2022/0103622 A1* | 3/2022 | Camargos | G06F 3/0626 |

* cited by examiner

*Primary Examiner* — Eileen M Adams
(74) *Attorney, Agent, or Firm* — Fish & Richardson P.C.

(57) ABSTRACT

A separable common aperture fusion binocular, including: a sensor unit, an ocular unit, and a control unit. The sensor unit includes: a fusion aperture, a laser range finder, and an infra-red illuminator. The ocular unit includes: at least one high-definition display and an ocular lens assembly for viewing data received from the sensor unit on the at least one high-definition display. The control unit provides functionality for control of the sensor unit and data display in the ocular unit.

6 Claims, 8 Drawing Sheets

SEPARABLE COMMON APERTURE FUSION BINOCULAR

CROSS-REFERENCE TO RELATED APPLICATION

This application claims the benefit of priority to U.S. Application No. 63/439,307, filed on Jan. 17, 2023, the contents of which is hereby incorporated by reference.

BACKGROUND

A traditional binocular provide a single spectral functionality, such as viewing an object in visible light or with night vision capabilities. To view images, the traditional binocular is configured with an optical path that requires an operator to look into ocular lenses which magnify an image of an object as viewed through objective lenses. Diopter and focus controls and an ability to vary interpupillary distance of the ocular lenses are provided to allow different operators to adjust the binocular to suit individual interpupillary distance and diopter needs, and to adjust for distance to the object from the binocular. As a traditional binocular is configured as a single unit, an operator must be directly behind the binocular to view an object through the binocular, even if doing so could expose the operator to danger or detection.

SUMMARY

The present disclosure describes a separable common aperture fusion binocular.

In an implementation, a separable common aperture fusion binocular, comprising: a sensor unit, comprising: a fusion aperture; a laser range finder; and an infra-red illuminator; an ocular unit, comprising: at least one high-definition display; and an ocular lens assembly for viewing data received from the sensor unit on the at least one high-definition display; and a control unit, wherein the control unit provides functionality for control of the sensor unit and data display in the ocular unit.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the separable common aperture fusion binocular (or "fusion binocular") can provide a fusion of more than one spectral functionality, for example, a combination of visible and short-wave infra-red (SWIR) or long-wave infra-red (LWIR), which can be viewed simultaneously by an operator. Second, the fusion binocular is configured to be separable into up to three separate digital units: 1) a sensor unit containing visible and invisible light sensors, laser range finder (LRF), infra-red (IR) illuminator, and alignment laser; 2) an ocular unit containing one or more high-definition displays and ocular lens assembly; and 3) a control unit for controlling the sensor unit functions and data display functions of the ocular unit. The separable functionality permits the operator to place the sensor unit in a safe location (for example, in a vehicle, on a wall, or on a tripod) and to remotely view and control the sensor unit with the ocular unit and control unit, respectively. Third, the remotely operable functionality helps decrease detectability of an operator and increase operator safety. Fourth, a proprietary ocular lens assembly eliminates the need to make interpupillary distance, diopter, and focus adjustments. Therefore the fusion binocular can be quickly shared between different operators without a need to make interpupillary distance, diopter, and focus adjustments.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
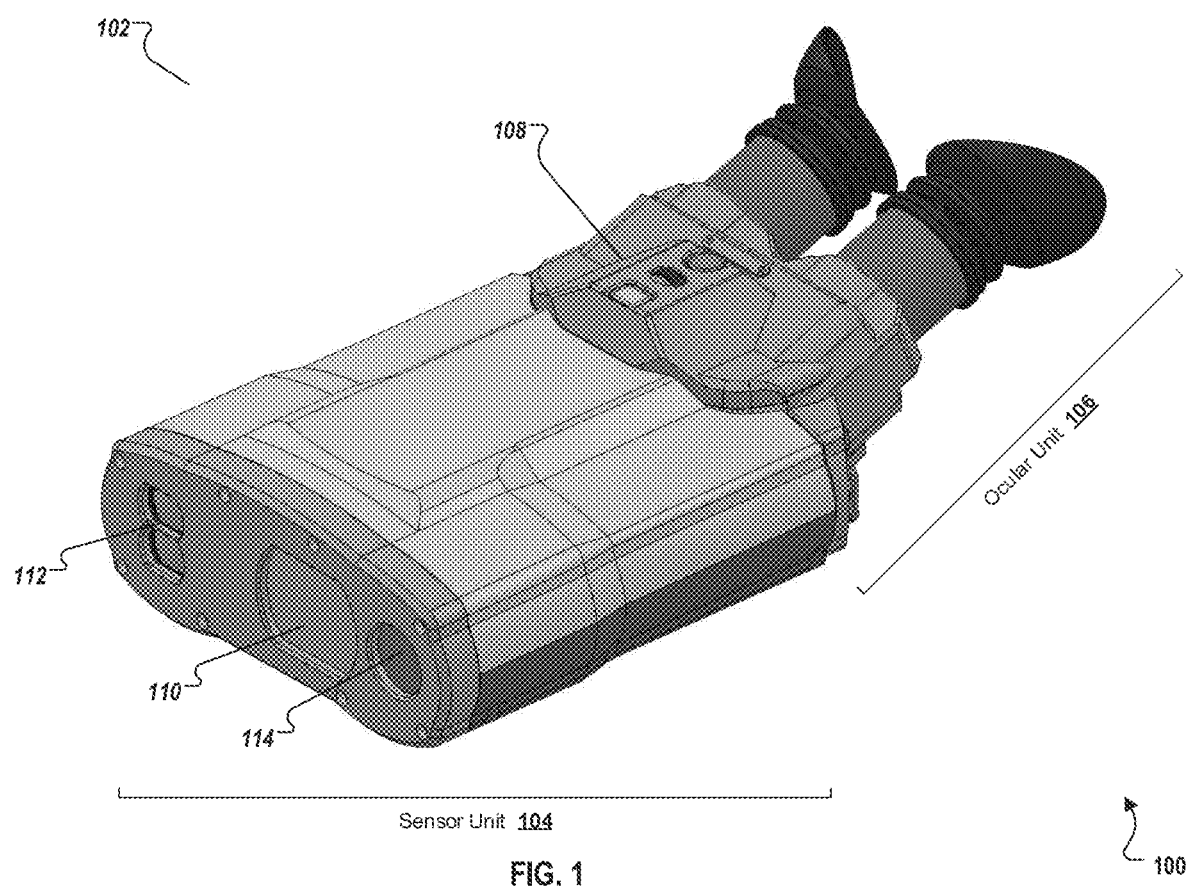
FIG. 1 is a top perspective view of a separable common aperture fusion binocular, according to an implementation of the present disclosure.

The following detailed description describes a separable common aperture fusion binocular (or "fusion binocular"), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A traditional binocular provide a single spectral functionality, such as viewing an object in visible light or with night vision capabilities. To view images, the traditional binocular is configured with an optical path (that is, from objective lenses to ocular lenses) that requires an operator to look into ocular lenses which magnify an image of an object as viewed through objective lenses. Diopter and focus controls and an ability to vary interpupillary distance of the ocular lenses are provided to allow different operators to adjust the binocular to suit individual interpupillary distance and diopter needs, and to adjust for distance to the object from the binocular. As a traditional binocular is configured as a single unit, an operator must be directly behind the binocular to view an object through the binocular, even if doing so could expose the operator to danger or detection.

While the described fusion binocular can be used in a form factor similar to a standard binocular, the fusion binocular is configured to be separable into up to three separate interoperably connected digital units. In some implementations, the three separate digital units are: 1) a sensor unit containing digital sensors (or "cores") (for example, a combination of visible and short-wave infra-red (SWIR) or long-wave infra-red (LWIR), and which can be viewed simultaneously by an operator), laser range finder (LRF), infra-red (IR) illuminator, and alignment laser; 2) an ocular unit containing one or more high-definition displays and proprietary ocular lens assembly; and 3) a control unit for controlling the sensor unit functions and display/data functions in the ocular unit. In some implementations, the interoperable connections between the digital units can be uni-directional or bi-directional.

In some implementations, one or more of the separate digital units can be interoperably connected using hardlinks (that is, a physical cable or wire). In some implementations, the hardlink between the sensor unit and the ocular unit can be at least 5.0-10.0 m and between the ocular unit and the control unit at least 0.5-1.0 m. In some implementations, the hardlink can supply power from the sensor unit to the ocular unit and/or the control unit. In some implementations, the sensor unit has a retractable hardlink cable for connection to the ocular unit. In some implementations, the ocular unit has a retractable cable for connection to the control unit.

In some implementations, one or more of the separate digital units can be interoperably connected using wireless technologies, such as Bluetooth or Wi-Fi. For example, the ocular unit and the control unit can be connected using Bluetooth and the ocular unit and the sensor unit can be connected using a hardline, as previously described.

The separable functionality permits the operator to place the sensor unit in a safe location (for example, in a vehicle, on a wall, or on a tripod) and to remotely view and control the sensor unit (for example, for surveillance, stakeout, or security monitoring) with the ocular unit and control unit, respectively. The remotely operable functionality helps to decrease detectability of an operator and increase operator safety. In some implementations, a handle mount or other mount consistent with this disclosure is considered to be within the scope of this disclosure. The control unit can also be used to control data display functionality in the ocular unit.

The fusion binocular ocular unit is also configured with a proprietary ocular lens assembly designed with high-order polynomials, which eliminates the need to make interpupillary distance, diopter, and focus adjustments for an operator. For example, in some implementations, the ocular lens can automatically adjust for interpupillary values of 56-76 mm, +/−4.0 diopters, and 6.0 m to infinity. Therefore the fusion binocular can be quickly shared between different operators without a need for adjustments.

In some implementations, the cases of each of the three separate digital units can be configured to provide various levels of waterproofing or dust proofing, for example the Ingress Protection Standard (IP) IP67.

Turning to FIG. 1, FIG. 1 is a top perspective view 100 of a separable common aperture fusion binocular 102, according to an implementation of the present disclosure. The fusion binocular 102 is shown combined and including the sensor unit 104 and ocular unit 106. In the illustrated implementation, the ocular unit 106 includes controls 108 instead of the controls 108 being part of a separate control unit (as previously discussed). In another implementation, the upper portion of the ocular unit 106 (that is, the portion with the controls 108) could be configured to be detachable as a separate previously mentioned control unit. Also note that the upper portion of the illustrated ocular unit 106 (that it, with controls 108) has a shape similar to that of a gaming console and could be held in one or two hands to provide control functionality if separable from the ocular unit 106.

The illustrated sensor unit 104 includes a fusion aperture 110 of visible and thermal sensors (for example, optical and short-wave infra-red (SWIR) or long-wave infra-red (LWIR)), LRF 112, IR illuminator 114, and alignment laser (not illustrated). In some implementations an alignment laser aligned with the LRF 112 can be located proximate to the LRF 112 apertures (for example, in the middle or either to the left or right of) and provide an alignment of the LRF 112 to the optical path of the visible/thermal sensors.

In some implementations, the fusion aperture 110 sensors can include a full high-definition (HD) complementary metal-oxide-semiconductor (CMOS) sensor with 1920× 1080 resolution and SWIR/LWIR sensors with 640×480 resolution. In some implementations, the sensors can be configured as 30 Hz or 60 Hz versions.

In typical implementations, the fusion aperture 110 can provide a visual fusion of up to three cores in the ocular unit 106. In some implementations, available multiple fusion display views in the ocular unit 106 can include single sensor or fusion views.

In some implementations, an integrated computer in the sensor unit 104 can provide image processing enhancement modes.

In some implementations, the sensor unit 104 and/or the ocular unit 106 can include an inertial measurement unit (IMU) and/or a global positioning system (GPS) functionality.

In some implementations, the IR illuminator can be configured as a near infra-red (NIR) illuminator.

In some implementations, the optical field-of-view of the fusion binocular 102 can be 8.7 degrees. In other implementations, the fusion binocular can be configured with wide or narrow field-of-view.

With respect to the ocular unit 106, when detached, the ocular unit 106 can be used for an augmented reality (AR) or virtual reality (VR) headset (for example strapped to the operator's head) or handheld. The ocular unit 106 is configured with one or two HD displays (for example, 1920× 1080 organic light emitting diode (OLED)). When looking through the proprietary ocular lens assembly, the operator perceives a very large display that provides a better immersive experience and higher field-of-view/angular resolution. Two HD displays can also be used to generate imaging perceived as three-dimensional (3D). In some implementations, the ocular unit 106 can overlay data, AR-type scenes, ranging information, visible and/or thermal views and fusion views. In some implementations, the ocular unit 106 can receive data from multiple sensor units 104 and stitch data from the multiple sensor units 104 for display in the ocular unit 106. In some implementations, the ocular unit 106 with associated controls 108 can be used to control multiple sensor units. In some implementations, the ocular unit 106 can be used to initiate broadcast of data to other ocular units 106 and/or mobile devices (for example, mobile phones or tablets).

In some implementations, the controls 108 can include ON/OFF, zoom with a wheel, controls for menus, and switches. The controls 108 can be used to control data display functionality in the ocular unit 106.

Figure 2:
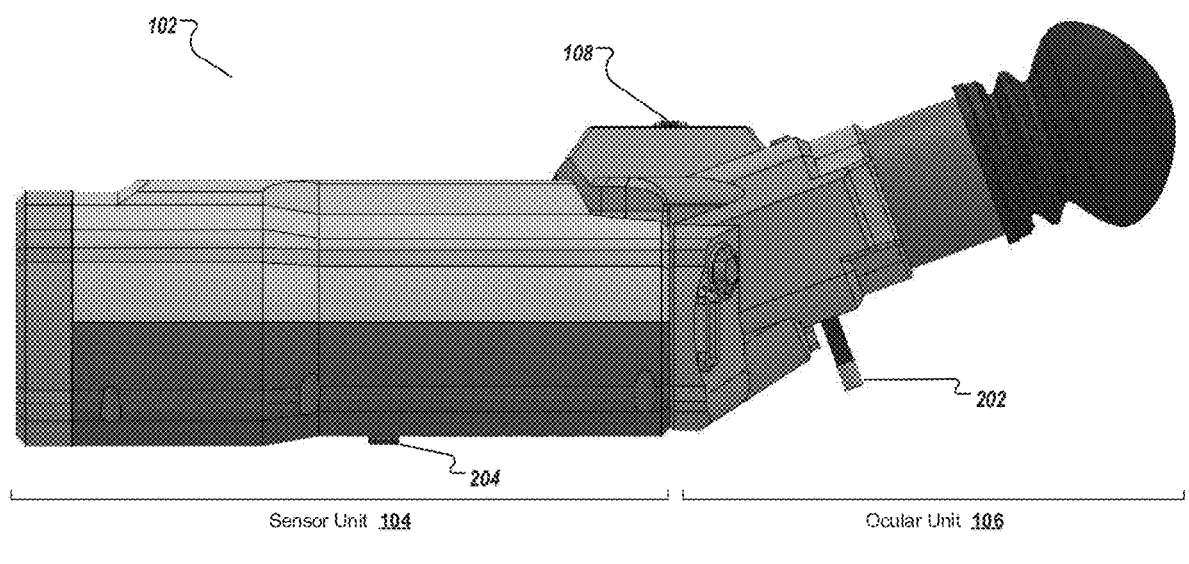
FIG. 2 is a left side view of a separable common aperture fusion binocular, according to an implementation of the present disclosure.

FIG. 2 is a left side view 200 of a separable common aperture fusion binocular 102, according to an implementation of the present disclosure. Also illustrated is a hardlink connection port 202 for connection to the sensor unit 104 and a mounting point 204 (for example, to a ¼-20 tripod mount).

In some implementations, the LRF 112 can be configured with a 3 km range.

Figure 3:
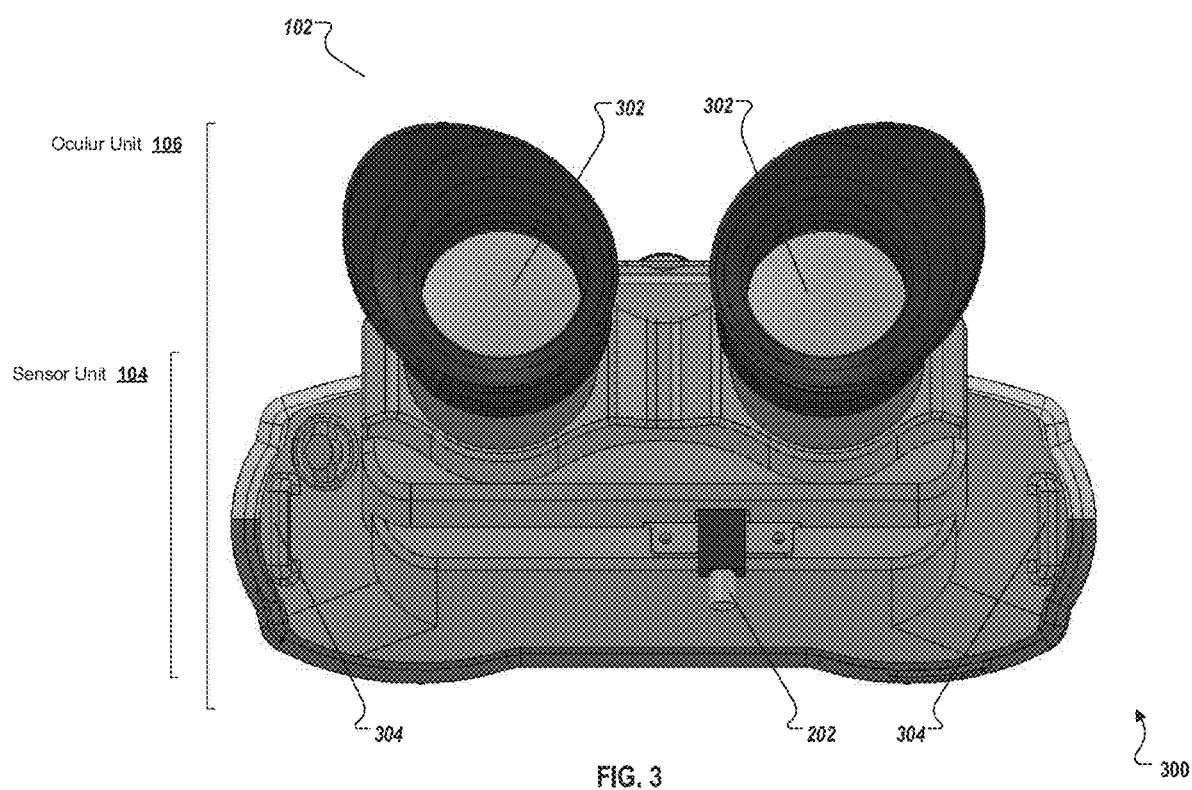
FIG. 3 is a back view of a separable common aperture fusion binocular, according to an implementation of the present disclosure.

FIG. 3 is a back view 300 of a separable common aperture fusion binocular 102, according to an implementation of the present disclosure. Also illustrated are ocular lenses 302 of the ocular unit 106 proprietary ocular lens assembly (not illustrated) and strap mounts 304 for attaching, for example, a neck strap, sling, or head strap to attach the ocular unit to an operators face for an AR or VR application.

Figure 4:
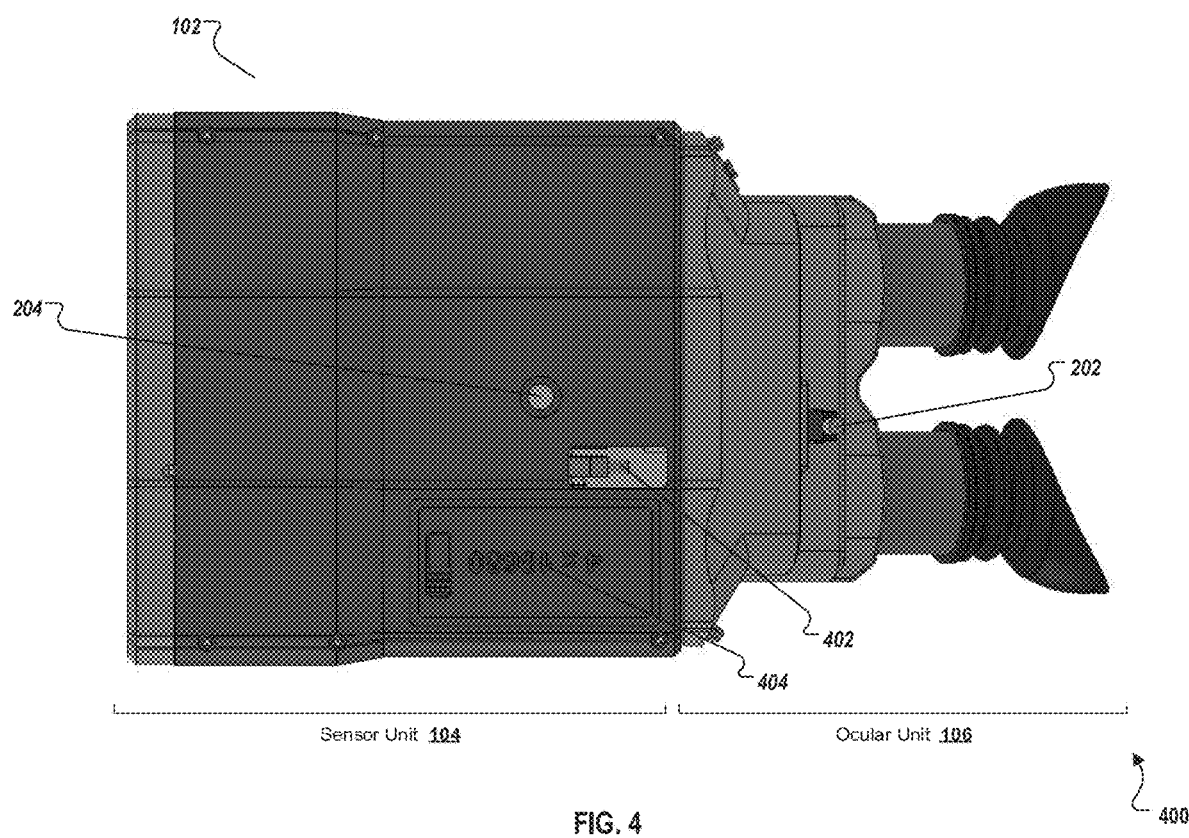
FIG. 4 is a top view of a separable common aperture fusion binocular, according to an implementation of the present disclosure.

FIG. 4 is a top view of a separable common aperture fusion binocular 102, according to an implementation of the present disclosure. Also illustrated are a hardlink connection port 402 for connection to hardlink connection port 202 and battery compartment 404. In some implementations, the fusion binocular requires 4×18650 sized batteries. In some implementations, the batteries can be rechargeable and recharged by plugging the hardline port 402 in to a power supply to supply power for battery recharging.

Figure 5:
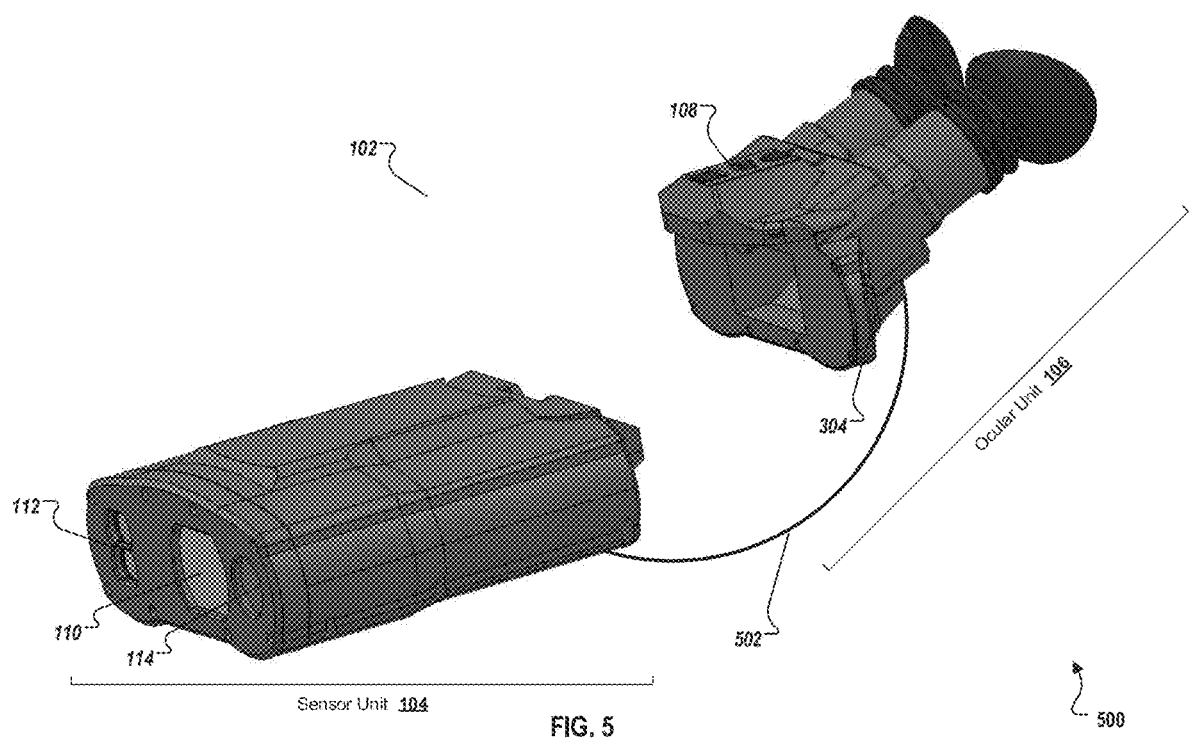
FIG. 5 is a top perspective view of a common aperture fusion binocular separated into a sensor unit and a combined ocular/control unit, according to an implementation of the present disclosure.

FIG. 5 is a top perspective view of a common aperture fusion binocular 102 separated into a sensor unit 104 and an ocular unit 106, according to an implementation of the present disclosure. As illustrated, the sensor unit 104 and ocular until 106 are configured in such a way so that they couple securely when joined together. Although not illustrated, in some implementations, a latch assembly is configured to permit the sensor unit 104 and ocular unit 106 to be separated and joined together. While also not illustrated, in some implementations, one or more of a mechanical, electrical, or data connection can be configured and engaged between the sensor unit 104 and the ocular unit 106 when joined together. These connections can provide electrical power and data sharing between the sensor unit 104 and the ocular unit 106.

In some implementations, hardlink cable 502 is connected to hardlink connection port 202 of the sensor unit 104 and the hardlink connection port 402 of the ocular unit 106. In some implementations, hardlink cable 502 is retracted into the sensor unit 104 and has hardlink connection port 202 attached to one end. In some implementations, when the sensor unit 104 is separated from ocular unit 106, the hardlink connection port 202 and hardlink cable 502 is pulled out of the sensor unit 104 and plugged into hardlink connection port 402 of the ocular unit to provide power to the ocular unit 106 and bi-directional data connection between the sensor unit 104 and ocular unit 106 (for example, to update the HD displays in the ocular unit 106 and to provide control functionality from the ocular unit 106 to the sensor unit 104).

In some implementations, a wireless technologies data connection can be configured between the sensor unit 104 and ocular unit 106 and each of the sensor unit 104 and ocular unit 106 can be configured to run off batteries (for example, 18650 batteries similar to those stored in battery compartment 404 of FIG. 4). In this implementation, hardlink wire 502 can be stowed for backup/secure use or be omitted for wireless connectivity only.

Figure 6:
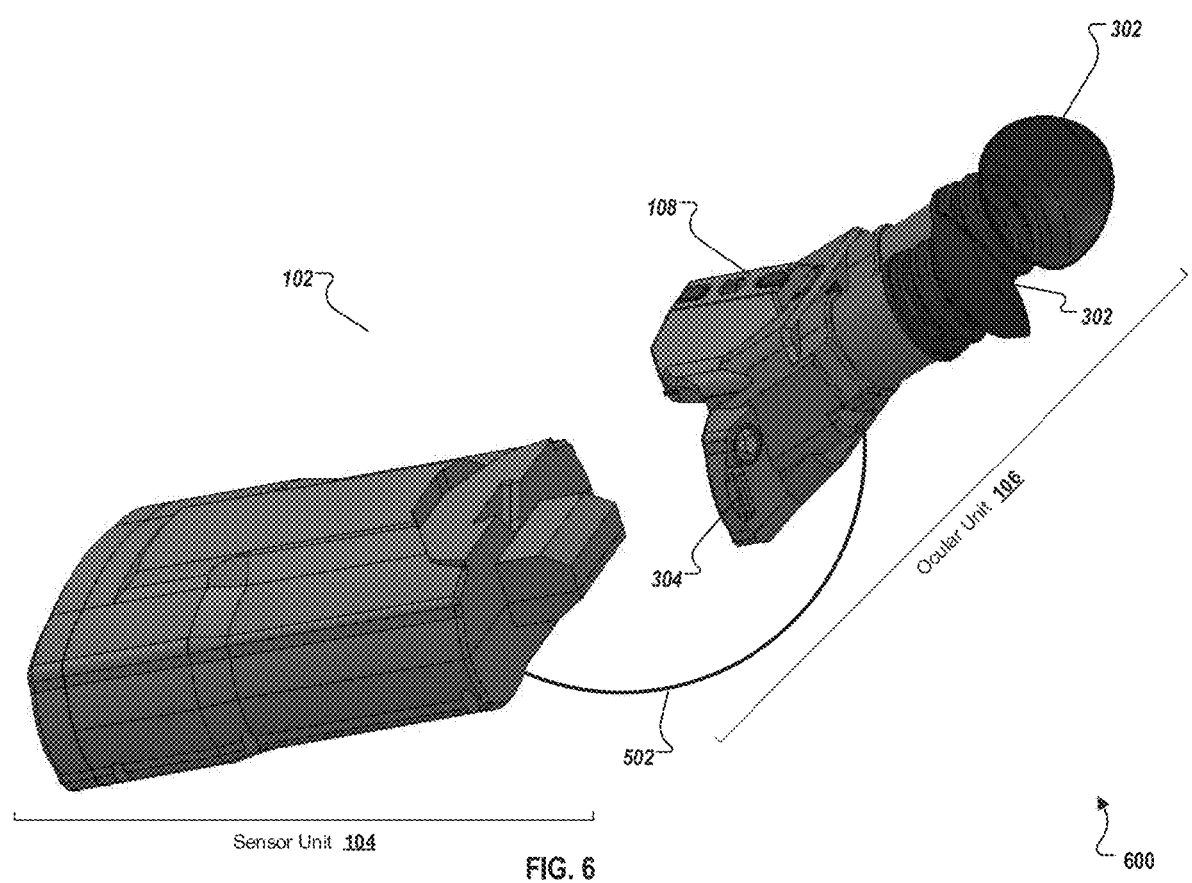
FIG. 6 is a left side perspective view of a common aperture fusion binocular separated into a sensor unit and a combined ocular/control unit, according to an implementation of the present disclosure.

FIG. 6 is a left side perspective view of a common aperture fusion binocular separated into a sensor unit 104 and an ocular unit 106, according to an implementation of the present disclosure.

Figure 7:
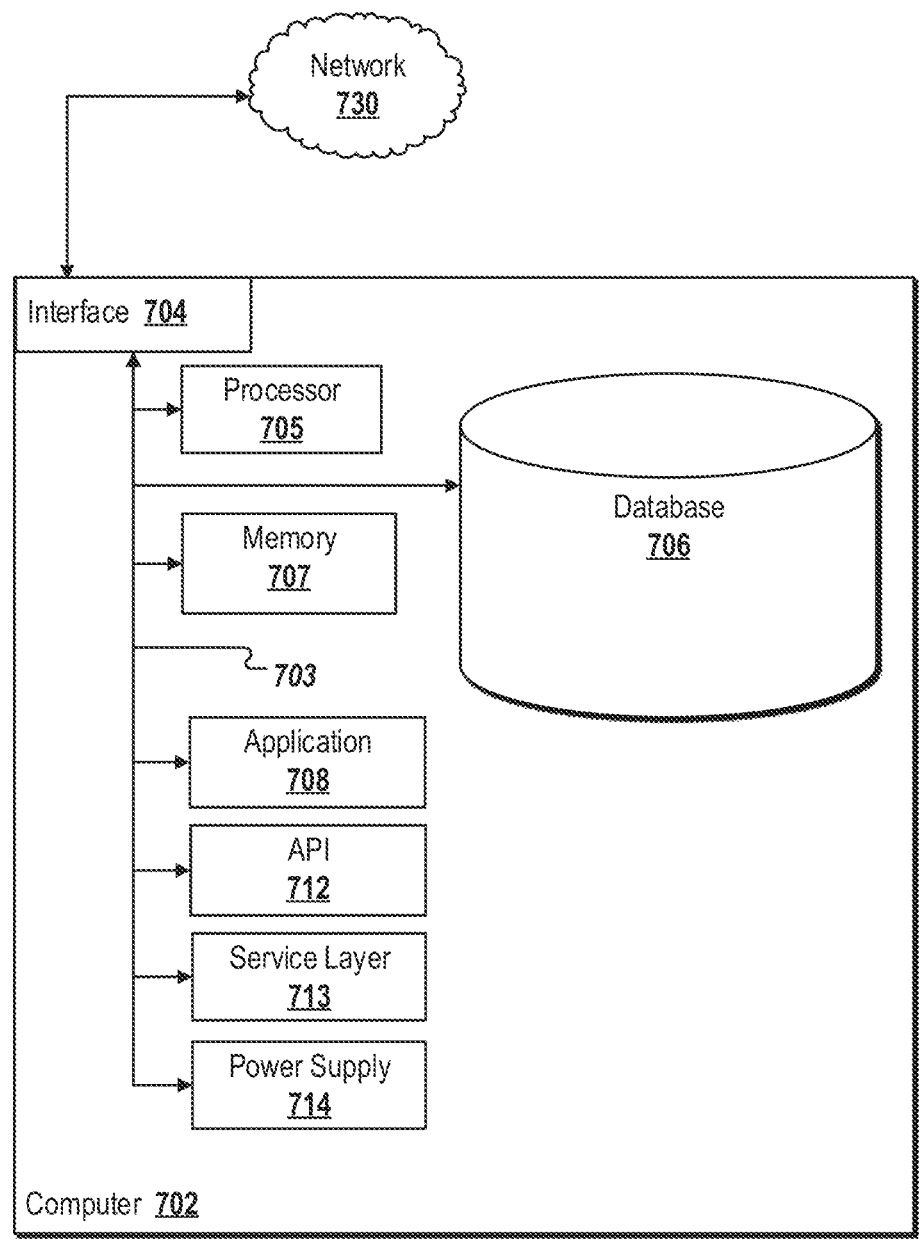
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702. The Database 706 can hold and operate on any data type consistent with the disclosure.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Figure 8:
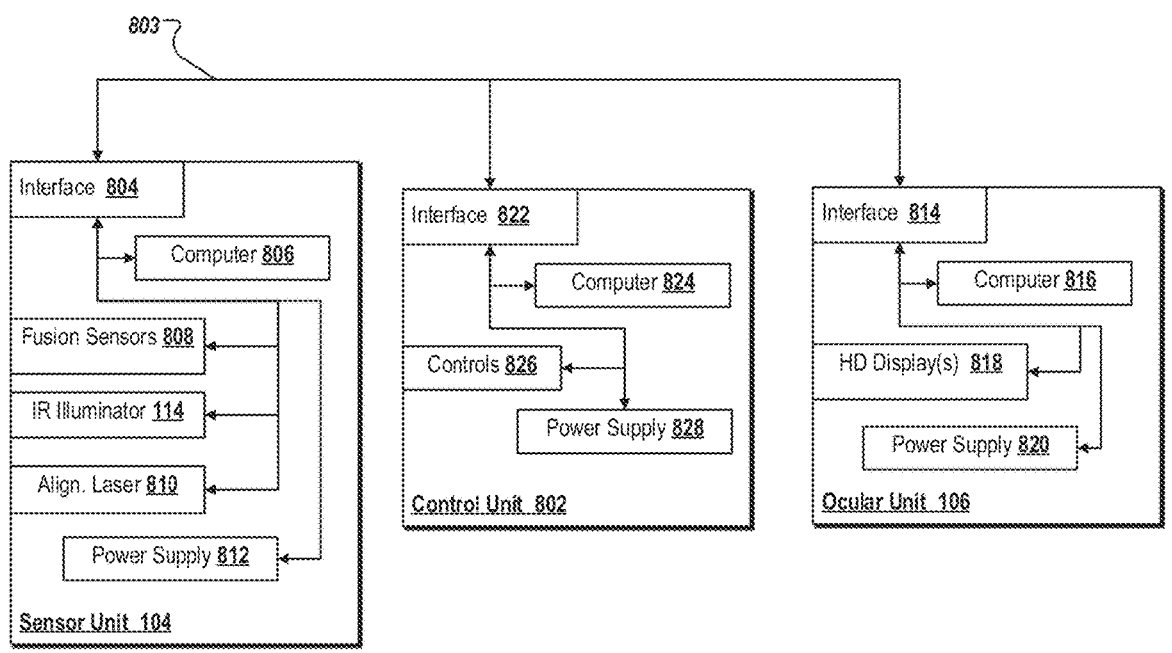
FIG. 8 is a block diagram illustrating an example of a computer-implemented separable common aperture fusion binocular, according to an implementation of the present disclosure.

FIG. 8 is a block diagram illustrating an example of a computer-implemented separable common aperture fusion binocular 102, according to an implementation of the present disclosure. The sensor unit 104, ocular unit 106 and controls unit 802 of the fusion binocular 102 is shown. The controls unit 802 is illustrated separate from the ocular unit 106. Data/electrical connection 803 is illustrated between the three digital units and can represent a hardlink and/or softlink.

With respect to the sensor unit 104, interface 804, computer 806, fusion sensors 808 (for example, fusion aperture 110 sensors), IR illuminator 114, alignment laser 810, and power supply 812 are illustrated. Interface 804 (for example, an interface 704 of FIG. 7) can provide electrical/data hardlink or data softlink functionality for the sensor unit 104. Computer 806 (for example, a computer 702 as in FIG. 7) can provide described functionalities with respect to the sensor unit 104. Alignment laser 810 can provide alignment laser functionality as previously described. Power supply 812 can provide power to the sensor unit 104 and/or the ocular unit 106 and control unit 802.

With respect to the ocular unit 106, interface 814, computer 816, HD display(s) 816 as previously described, and power supply 820 are illustrated. Interface 814 (for example, an interface 704 of FIG. 7) can provide electrical/data hardlink or data softlink functionality for the ocular unit 106. Computer 816 (for example, a computer 702 as in FIG. 7) can provide described functionalities with respect to the ocular unit 106. Power supply 820 can provide power to the ocular unit 106 and/or the sensor unit 104 and control unit 802. In some implementations, power supply 820 can be omitted.

With respect to the control unit 802, interface 822, computer 824, controls 826 as previously described, and power supply 828 are illustrated. Interface 822 (for example, an interface 704 of FIG. 7) can provide electrical/data hardlink or data softlink functionality for the control unit. Computer 824 (for example, a computer 702 as in FIG. 7) can provide described functionalities with respect to the control unit 802. Power supply 828 can provide power to the control unit 802 and/or the sensor unit 104 and ocular unit 106. In some implementations, power supply 828 can be omitted.

Described implementations of the subject matter can include one or more features, alone or in combination.

For example, in a first implementation, a separable common aperture fusion binocular, comprising: a sensor unit, comprising: a fusion aperture; a laser range finder; and an infra-red illuminator; an ocular unit, comprising: at least one high-definition display; and an ocular lens assembly for viewing data received from the sensor unit on the at least one high-definition display; and a control unit, wherein the control unit provides functionality for control of the sensor unit and data display in the ocular unit.

The foregoing and other described implementations can each, optionally, include one or more of the following features:

A first feature, combinable with any of the following features, wherein the sensor unit, the ocular unit, and the control unit are physically separated and operated using at least one of a hardlink or softlink.

A second feature, combinable with any of the previous or following features, wherein the fusion aperture comprises a combination of visible and short-wave infra-red (SWIR) or long-wave infra-red (LWIR) sensors.

A third feature, combinable with any of the previous or following features, wherein the sensor unit comprises an alignment laser aligned with the laser range finder and used to align the sensors associated with the fusion aperture.

A fourth feature, combinable with any of the previous or following features, wherein the at least one hi-definition display comprises two high-definition displays.

A fifth feature, combinable with any of the previous or following features, wherein the ocular lens assembly is configured to require no interpupillary distance, diopter, or distance to target adjustments for different operators.

A sixth feature, combinable with any of the previous or following features, wherein the ocular unit provides augmented reality (AR) or virtual reality (VR) functionality with respect to the data received from the sensor unit.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A separable common aperture fusion binocular, comprising:
    a sensor unit, comprising:
        a fusion aperture;
        a laser range finder; and
        an infra-red illuminator;
    an ocular unit, comprising:
        at least one high-definition display; and
        a high-order polynomial ocular lens assembly for viewing data received from the sensor unit on the at least one high-definition display, wherein the ocular lens assembly automatically adjusts for interpupillary, diopter, and distance to target values in a range of 56-76 mm, +/−4.0, and 6.0 m to infinity, respectively, without individual user adjustments; and
    a control unit, wherein the control unit provides functionality for control of the sensor unit and data display in the ocular unit.

2. The separable common aperture fusion binocular of claim 1, wherein the sensor unit, the ocular unit, and the control unit are physically separated and operated using at least one of a hardlink or softlink.

3. The separable common aperture fusion binocular of claim 1, wherein the fusion aperture comprises a combination of visible and short-wave infra-red (SWIR) or long-wave infra-red (LWIR) sensors.

4. The separable common aperture fusion binocular of claim 3, wherein the sensor unit comprises an alignment laser aligned with the laser range finder and used to align the sensors associated with the fusion aperture.

5. The separable common aperture fusion binocular of claim 1, wherein the at least one hi-definition display comprises two high-definition displays.

6. The separable common aperture fusion binocular of claim 1, wherein the ocular unit provides augmented reality (AR) or virtual reality (VR) functionality with respect to the data received from the sensor unit.

* * * * *